Dec. 7, 1965  E. L. KILBOURN  3,221,766
PULSATOR VALVE HAVING STACKED VALVING RINGS
Filed June 25, 1963
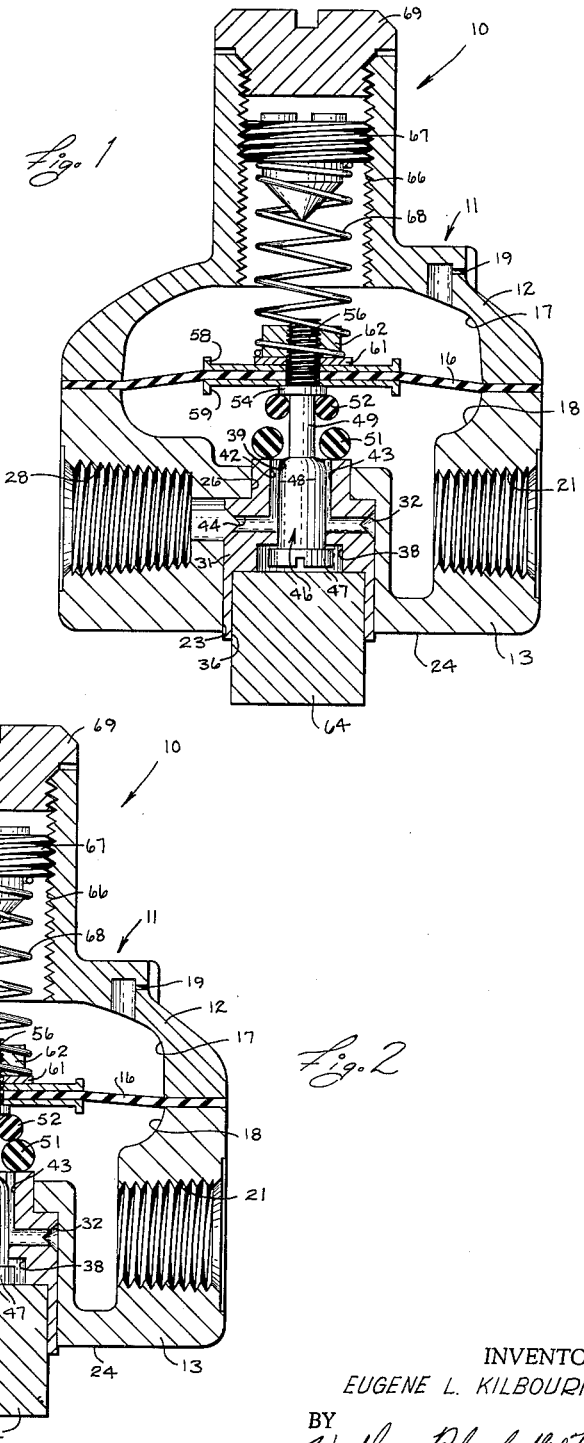
INVENTOR.
EUGENE L. KILBOURN
BY
Woodhams, Blanchard and Flynn
ATTORNEYS – # United States Patent Office 3,221,766
Patented Dec. 7, 1965

3,221,766
PULSATOR VALVE HAVING STACKED
VALVING RINGS
Eugene L. Kilbourn, Marengo Township, Calhoun County, Mich., assignor to S. H. Leggitt Company, Marshall, Mich., a corporation of Michigan
Filed June 25, 1963, Ser. No. 290,384
5 Claims. (Cl. 137—510)

This invention relates in general to a pulsating gas valve and, more particularly, relates to a gas valve which alternately opens in response to gas pressure and closes in response to a nonlinear restoring force for causing pulsed gas flow to a point of use.

The device of the invention is useful in a number of situations which, for example, include a flashing gas light such as the one shown in United States Patent No. 1,528,485. Other possible uses include detection of gas flow at such low amounts as to be unmeasurable by conventional means. Gas entering the device of the invention from a source having a desired pressure increases in pressure within the device to a preselected maximum value at which value the valve opens and stays open until the pressure drops to a minimum value generally substantially lower than the aforementioned preselected maximum pressure value.

Previous devices have been constructed for performing in a broadly similar manner but have often been unsatisfactory where quick, positive opening and closing action has been a prime requisite. This deficiency has often been due to the means used to open and close the valve. Of the various ones of such means heretofore employed wherein a nonlinear force is achieved, the permanent magnet has shown promise as an active element. However, previous valves including magnets for this purpose, insofar as I am aware, have generally been overly complex in construction, have employed excessive amounts of mechanical linkage between the elements thereof and have usually used complex valving means. This has led to inefficient and slow operation as well as high manufacturing cost.

Hence, the objects of this invention include:

(1) To provide a flow regulating valve for compressible fluids which is stable only in the open or closed states and which is thus essentially a bistable device.

(2) To provide a device, as aforesaid, which opens to fluid flow therethrough in response to the pressure of said fluid reaching a preselected maximum level.

(3) To provide a device, as aforesaid, which is maintained closed to fluid flow therethrough by forces at least partially nonlinear in effect.

(4) To provide a device, as aforesaid, which closes in response to means additional to that maintaining said valve in a closed position.

(5) To provide a device, as aforesaid, wherein the time interval required to shift from a closed to an open state is extremely short, virtually instantaneous, and wherein the time interval required to shift from an open to a closed state is of similar, or only slightly larger, magnitude.

(6) To provide a device, as aforesaid, which employs a permanent magnet as closure maintaining means.

(7) To provide a device, as aforesaid, in which the time interval during which the device is maintained closed, the time interval during which the device is maintained open, and the volume of fluid delivered by said device are preselectable.

(8) To provide a device, as aforesaid, having exceptionally simplified valving means and over-all construction and which contains only a single moving part.

(9) To provide a device, as aforesaid, which is constructed of stock or easily made parts, which has a minimum of parts, is quickly assembled and inexpensively manufactured, is durable and will have a long service life, will require a minimum of maintenance, and will be easy to maintain by unskilled personnel.

Other objects and purposes of the invention will be apparent to persons acquainted with apparatus of this general type upon reading the following disclosure and inspecting the accompanying drawings.

In the drawings:
FIGURE 1 is a central cross-sectional view of a fluid valve embodying the invention.
FIGURE 2 is similar to FIGURE 1 showing the parts thereof in a different position.

The following description will use the terms "upper," "lower," "left," "right," "front," and "rear" which will have reference to the valve and parts thereof as appearing in FIGURES 1 and 2. The terms "inner" and "outer" will refer to the geometric center of the apparatus. The above terms together with derivatives thereof and words of similar import will be used for convenience in reference only and not as limiting.

General description

The objects and purposes of the invention, including those set forth above have been met by the provision of a valve having a pair of chambers separated by an essentially continuous diaphragm. The diaphragm has rod means fixed with respect thereto and extending through one of said chambers. The other end of said rod means is slidably guided in a bushing and its extremity is located adjacent a magnet fixed with respect to the shell of the valve. Valve means constitute a first resilient ring coaxial with, movable with and closely surrounding the midportion of said rod and a second resilient ring surrounding and slightly spaced from said rod but lying on the face of said bushing whereby when said valve is closed, said rings are in continuous sealing contact. Hence, when gas pressure in said one chamber causes said diaphragm to move said rod away from said magnet, gas flows between said resilient rings, along said rod and out of said valve.

Detailed description

A valve 10 embodying the invention includes a housing 11 comprising an upper or bonnet member 12 and a lower or body member 13. The bonnet 12 and body 13 are connected by any convenient means such as screws, not shown, and have a diaphragm membrane 16 interposed and held therebetween. The bonnet member 12 defines with the diaphragm 16 an air chamber 17 therewithin and the body member 13 defines with said diaphragm 16 a gas chamber 18 therewithin. The air chamber 17 is connected through an opening 19 with the atmosphere for relieving excess pressures therewithin. The gas member 18 has an inlet opening 21 for communication with any desired source of compressible fluid under pressure, such as a combustible gas.

The body member 13 has a preferably central recess 23 in the bottom face 24 thereof which recess communicates through a preferably coaxial central opening 26 with the gas chamber 18. The central recess 23 also communicates with an outlet opening 28 which opens through the side wall of the body member 13 and which may be connected to any means, not shown, to which it is desired to feed in an intermittent manner, said compressible fluid. The bushing 31, preferably of nonmagnetic material such as brass, fits into and fills the central recess 23 and central opening 26 and is retained therein by any convenient means such as a pressed fit. The bushing 31 has a circumferential groove 32, defining with the inner peripheral wall of the central recess 23, a passageway communicating with the outlet opening 28. The bushing 31 has a lower recess 36 in the bottom face thereof and an upper recess 38 nesting in and preferably coaxial with said lower recess 36. The upper recess 38 communicates through a hole 39 with the upper end of the bushing 31. The hole 39 has a plurality of axial grooves, here indicated at 42 and 43, in the circumferential wall thereof which communicate between the upper end of the bushing 31 and a transverse passage 44 which in turn connects to the circumferential groove 32.

A rod 46 of any magnetic material, usually iron, has a radially extending screw head 47 on the lower end thereof which lies below the upper surface of the recess 38 and a lower body portion 48 which is slidably but snugly fitted within the hole 39 of the bushing 31. The rod 46 has a midportion 49 which may be of reduced diameter and which has coaxial therewith and closely surrounding but slightly spaced therefrom a lower resilient ring 51, which may be a conventional O ring and which may be of any convenient resilient material such as neoprene. Ring 51 is maintained in contact with the upper end of the bushing 31 when the valve 10 is in its closed state by means which will become apparent later. The midportion 49 of the rod 46 has tightly fitted thereon about the ring 51 a coaxial upper resilient ring 52 which closely and continuously surrounds said rod 46 and which is preferably of smaller cross-sectional diameter and, hence, of smaller over-all diameter than the ring 51. The ring 52 is restrained from upward movement along the rod 46 by an annular flange 54 which is fixed to and may be integral with rod 46. The rod 46 has an upper threaded portion 56 above the flange 54. Diaphragm plates 58 and 59 sandwich the diaphragm 16 therebetween and have, along with the diaphragm 16, suitable openings therethrough through which the threaded portion 56 of the rod 46 extends. A washer 61 and nut 62 secure the rod 46 to the diaphragm 16.

The recess 36 in the bottom of the bushing 31 has a magnet 64 fixed therein by any convenient means such as a press fit which magnet attracts the rod 46 downwardly toward itself.

A threaded opening 66 is provided in the upper portion of the bonnet 12 engaging therein an adjusting screw 67. A compression spring 68 is disposed between the adjusting screw 67 and the diaphragm 16 or, more specifically, the washer 61, whereby downward adjustment of the adjusting screw 67 tends, through the spring 68, to more strongly bias the diaphragm 16 and rod 46 downwardly. A screw cap 69 is provided to seal the opening 66. Obviously, in cases where it is desired to bias the diaphragm 16 upwardly, as where the diaphragm 16 is overly stiff whereby it biases the valve too strongly toward the closed position, a tension spring may be substituted for the compression spring 68 after appropriate modifications of the adjustment screw 67 and means supported on the rod 46 for attachment of such a tension spring therebetween. Furthermore, in cases where other means, such as the attractive force of the magnet 64 or the deformation resistance of the diaphragm 16, provide the desired forces biasing the valve toward closure, the spring 68 may be omitted along with the adjusting screw 67.

Rod 46, when in contact with the magnet 64, is disposed so that the flange 54 presses the upper ring 52 downwardly against the ring 51 which is thus pressed axially downwardly against the upper face of the bushing 31 whereby to seal the inlet opening 21 from the outlet opening 28. When released by the magnet 64 and in its uppermost position limit as positively determined by interference between the upper surface of the recess 38 and the screw head 47 thereof, the rod 46 raises the resilient ring 52 to separate same from the resilient ring 51, whereby gas may flow between the adjacent faces of said rings and into the groove 43 to exit the valve 10.

It is generally preferred that the ring 51 be fixed to the bushing 31 by means such as a suitable adhesive, to maintain said ring 51 coaxial with the ring 52 for assuring a complete seal therebetween and for preventing said ring 51 from randomly interfering with the closing motion of the rod 46. The ring 52 is preferably fixed to the rod 46 by means such as a suitable adhesive to prevent displacement thereof along said rod 46.

*Operation*

Although the operation of the device embodying the invention has been disclosed to some extent hereinabove, said operation will now be further described for purposes of clearer understanding.

The valve is assumed in its closed position (FIGURE 2) whereupon a compressible fluid such as a combustible gas, for example, is fed from a suitable pressurized source thereof (not shown) into the inlet opening 21 at any desired rate which may be controlled by any convenient means, such as a needle valve (not shown). When the pressure within the gas chamber 18 reaches a predetermined maximum level, the upward pressure on the diaphragm 16 will be translated into an upward force on the rod 46 sufficiently great to disengage the screw head end 47 thereof from the magnet 64, whereupon said upward pressure on the diaphragm 16 will lift the rod 46 sufficiently to disengage the resilient rings 52 and 51 whereby the valve 10 assumes its open state of FIGURE 1.

The gas contained in the gas chamber 18 then flows between the rings 52 and 51, between the ring 51 and the midportion 49 of the rod 46 and downwardly through the axial grooves 42 and 43 into the transverse passage 44. The gas then flows into the circumferential groove 32 and out the outlet openings 28 to any suitable receiving means, which, if said gas is a combustible gas, may be a combustion device such as a gas light. After a sufficient amount of gas has flowed out of the gas chamber 18, the pressure therein drops to a predeterminable minimum level at which time the attractive force of the magnet 64 and the resilience of the diaphragm 16 will tend to move the rod 46 downwardly toward the magnet 64. If desired, the spring 68 of FIGURE 1 may be employed to furnish a further restoring force. These forces are relatively light compared to the force exerted upon the rod 46 by the magnet 64 when said rod and magnet are in contact and therefore it will be seen that said minimum pressure level in the chamber 18 will be considerably less than said maximum pressure level therein. In the particular embodiment disclosed herein, the rod 46 is, at its maximum distance from the magnet 64, still close thereto (only a few hundredths of an inch away), and the magnet 64 will still attract the rod 46 to some extent. Because the magnetic force is generally nonlinear with respect to distance and in fact, in particular geometries, is inversely related to the distance between coacting elements, the magnet 64 will have a stronger attraction for the rod 46 when said rod is very close to said magnet, at which time said magnetc force will become predominant. Said magnet force then further increases to its former maximum level when contact is made between the rod 46 and magnet 64.

It will be noted that the construction of the rod 46 and rings 51 and 52, together with the positioning of the bushing 31 with respect thereto, is such that when said rod is in its downward most position, both radial and axial forces are exerted upon the interface between the rings 51 and 52. The axial forces tend to compress the rings 51 and 52 axially and thereby provide a seal therebetween and between said rings and the contacting surfaces of the flange 54 and the bushing 31. Due to the fact that the ring 52 is preferably smaller than the ring 51 in over-all diameter as well as in cross-sectional diameter, the line of tangency in any plane radial to the rod 46 and passing between said rings 51 and 52 will be observed to slant downwardly and toward the center of the rod 46 whereby upon the assumption of the lower or closed position of the rod 46, the ring 51 will exert an inwardly directed radial force upon the ring 52 causing the latter to more tightly engage the rod 46. Hence, there is a tight seal between the ring 52 and its contacted surfaces of the rod 46 as due to an adhesive bond therebetween, a tight seal between the rings 51 and 52 and a tight seal between the ring 51 and the bushing 31 as due to an adhesive bond therebetween, thus making it impossible, when the rod 46 is in its downwardmost position, for gas to flow from the input opening 21 to the output opening 28.

Although the preferred embodiment herein disclosed includes as the upper valve element a resilient O-ring 52, it will be noted that a workable valve would result from the replacement of said O-ring 52 by a similar but non-resilient member or by suitable means integral with the rod 46 such as a radial and axial extension of the flange 54.

Upon the resumption by the rod 46 of its downwardmost position (FIGURE 2), the gas chamber 18 will again fill with gas to the aforementioned predetermined maximum pressure level and the above-described cycle repeats for as long as gas at sufficient pressure is supplied to the inlet opening 21.

The valve 10 completes its opening action and at least the last part of its closing action extremely rapidly. The means employed to restore the valve to its closed condition, which may include the resiliency of the diaphragm 16 and of the spring 68, produce forces generally linear with distance as is the opposing force due to gas pressure on the diaphragm 16 whereby the volume output of the valve is at least approximately constant during its open period. Hence, the volume versus time plot of gas output of the valve closely approximates a square wave. Thus, the valve 10 may be considered a self-triggering bistable device transferring instantaneously from one constant state to another and back again.

It will be apparent that the operating parameters of the valve which will be considered most important will depend upon the application to which the valve is put. In certain circumstances, however, such as for example, the intermittent supplying of combustible gas to a gas light, the parameters of valve closed time, valve open time and amount of gas supplied at the output opening 28 per pulse may be considered as chiefly important. It will be apparent that these parameters or any other set may be adjusted by a number of means. However, as a further example, the time interval during which the valve remains closed may be adjusted by adjusting the rate of flow of gas through the inlet opening 21 by any convenient means such as a valve, not shown. Needless to say, the pressure of the gas supplied to such a valve must be at least the pressure required to open the pulsating valve for proper operation of the pulsating valve to take place. Similarly, the time during which the valve will remain open can be adjusted by providing a suitable valve (not shown) between the output opening 28 and the device fed thereby, whereby the rate of gas flow out of the chamber 18 is regulated. Finally, the amount of gas per pulse delivered by the valve may be governed by consideration of the volume of the gas chamber 18 and of the maximum and minimum pressures utilized therewithin, said maximum pressure being capable of adjustment by means such as the spring 68 and adjusting screw 67.

Although a particular preferred embodiment of the invention has been disclosed hereinabove for purposes of illustration, variations or modifications thereof lying within the scope of the appended claims are fully contemplated.

What is claimed is:

1. In a valve for producing a pulsed flow of gas therethrough upon connection to a source of gas under pressure, the combination comprising:
    a valve body having an inlet opening and a gas chamber having a fixed wall, said inlet opening communicating with said gas chamber;
    means defining an outlet opening for said chamber in said fixed wall;
    a first resilient ring disposed on said fixed wall and surrounding said outlet opening;
    means reciprocable in alignment with said outlet opening toward and away from said fixed wall;
    a second resilient ring carried by said reciprocable means, said second resilient ring axially abutting said first ring when said reciprocable means is urged toward said fixed wall to close said outlet opening and being disengaged from said first ring when said reciprocable means is moved away from said fixed wall to allow gas flow between said rings and thence through said outlet opening;
    energizing means for causing said reciprocable means to move away from and toward said fixed wall in response to the occurrence of a predetermined maximum and minimum gas pressure in said gas chamber.

2. The device defined in claim 1 in which said resilient rings are O-rings, in which the average diameter of said second ring is less than that of said first ring and in which said reciprocable means comprises a rod snugly surrounded by said second ring and having a radial flange for preventing movement of said second ring on said rod away from said first ring, the difference in the diameter of said rings forcing said second ring radially inwardly against said rod as well as against said flange to improve sealing.

3. In a valve for producing a pulsed flow of gas therethrough upon connection to a source of gas under pressure, the combination comprising:
    a hollow valve body having a hollow interior;
    a flexible diaphragm dividing the interior of said valve body into a gas chamber and an air chamber;
    means defining an inlet opening extending through said valve body to said gas chamber;
    means defining an outlet in said valve body;
    a rod of magnetic material substantially coaxially affixed at one end thereof to said diaphragm and extending across said gas chamber;
    means defining a rod opening through the wall of said valve body substantially coaxial with said rod, the other end of said rod extending reciprocably into the inner end of said rod opening, said rod opening having at least one groove extending from the inner end of said rod opening and communicating intermediate the ends of said rod opening with said outlet opening;
    a magnet inserted into the outer end of said rod opening for axially attracting said rod;
    coaxial resilient rings on said rod and on said wall around said rod opening said rings being engageable upon engagement of said rod with said magnet for closing communication between said rod opening and said gas chamber and disengageable upon release of said rod by said magnet;
    a spring in said air chamber having one end fixed with respect to said valve body and the other end fixed with respect to said diaphragm for urging said rod toward said magnet.

4. In a pulsating valve fed by a pressurized source of compressible fluid, the combination comprising:
    a valve body having a gas chamber therein, said gas chamber having a nonmovable wall, and a wall movable in response to said pressure changes within said gas chamber, said gas chamber being connected to said source of compressible fluid;
    rod means fixed with respect to said movable wall, said rod means having a midportion defined at one end thereof by a radially outwardly extending annular flange and at the other end thereof by a continued portion of enlarged diameter;
    closure maintaining means producing a force on said rod means which is nonlinear with distance for preventing movement of said rod means from an initial position until the pressure within said gas chamber reaches a predetermined maximum level; and valve means operable upon movement of said rod means for said initial position for allowing discharge of gas within said gas chamber out thereof, said valve means including a first resilient annular ring tightly surrounding and coaxial with said rod means adjacent said flange and movable therewith and a second resilient ring coaxial with said rod means but spaced slightly therefrom and lying adjacent said nonmovable wall of said gas chamber;

restoring means returning said shaft means to said initial position upon reduction of the gas pressure within said gas chamber to a predetermined minimum level;

whereby when said rod means is in its initial position, said flange and said nonmovable wall exert an axially directed compressive force upon the adjacent faces of said first and second resilient rings and, hence, a similar force between said rings to constitute a compressive seal for sealing said valve closed and whereby as said maximum pressure is reached said rod means is moved by said movable wall out of said initial position by which said compressive seal is released and said valve is opened.

5. The device defined in claim 4 wherein said enlarged portion of said rod means extends through means defining an opening in said nonmovable wall of said gas chamber, said opening in said nonmovable wall having a plurality of grooves therein running axially of said rod means whereby gas escaping from the gas chamber may flow through said grooves; and wherein said grooves are connected by a passageway transverse of said rod means and by a further passageway circumferential of said rod means to an outlet of said valve.

References Cited by the Examiner
UNITED STATES PATENTS

| | | | |
|---|---|---|---|
| 2,367,260 | 1/1945 | Beddoes | 251—65 X |
| 2,484,102 | 10/1949 | Le Valley. | |
| 2,705,123 | 3/1955 | Hieger. | |
| 2,938,540 | 5/1960 | Schatzman | 251—65 X |
| 2,995,145 | 8/1961 | Heiser | 137—505.41 X |
| 3,091,254 | 5/1963 | Kilayko | 137—516.29 |

FOREIGN PATENTS

| | | |
|---|---|---|
| 94,079 | 4/1922 | Switzerland. |

ISADOR WEIL, *Primary Examiner.*